United States Patent [19]

Temple

[11] Patent Number: 4,889,212

[45] Date of Patent: Dec. 26, 1989

[54] SURGE BRAKE

[75] Inventor: Roger C. Temple, Cuyahoga Falls, Ohio

[73] Assignee: Joseph D. Alvado, Cleveland, Ohio

[21] Appl. No.: 156,401

[22] Filed: Feb. 16, 1988

[51] Int. Cl.$^4$ .............................................. B60T 7/20
[52] U.S. Cl. .............................................. 188/112 R
[58] Field of Search ................ 280/446 R; 188/112 R

[56] References Cited

U.S. PATENT DOCUMENTS 3,342,292  9/1967  Wherry ........................... 188/112 R

FOREIGN PATENT DOCUMENTS 838113  5/1952  Fed. Rep. of Germany ...... 188/112

Primary Examiner—John A. Pekar
Attorney, Agent, or Firm—Woodling, Krost and Rust

[57] ABSTRACT

A drawbar is disclosed having an integral surge brake unit located at the opposing end of the drawbar from the hitch coupling so as to reduce the effective weight of the drawbar.

20 Claims, 2 Drawing Sheets

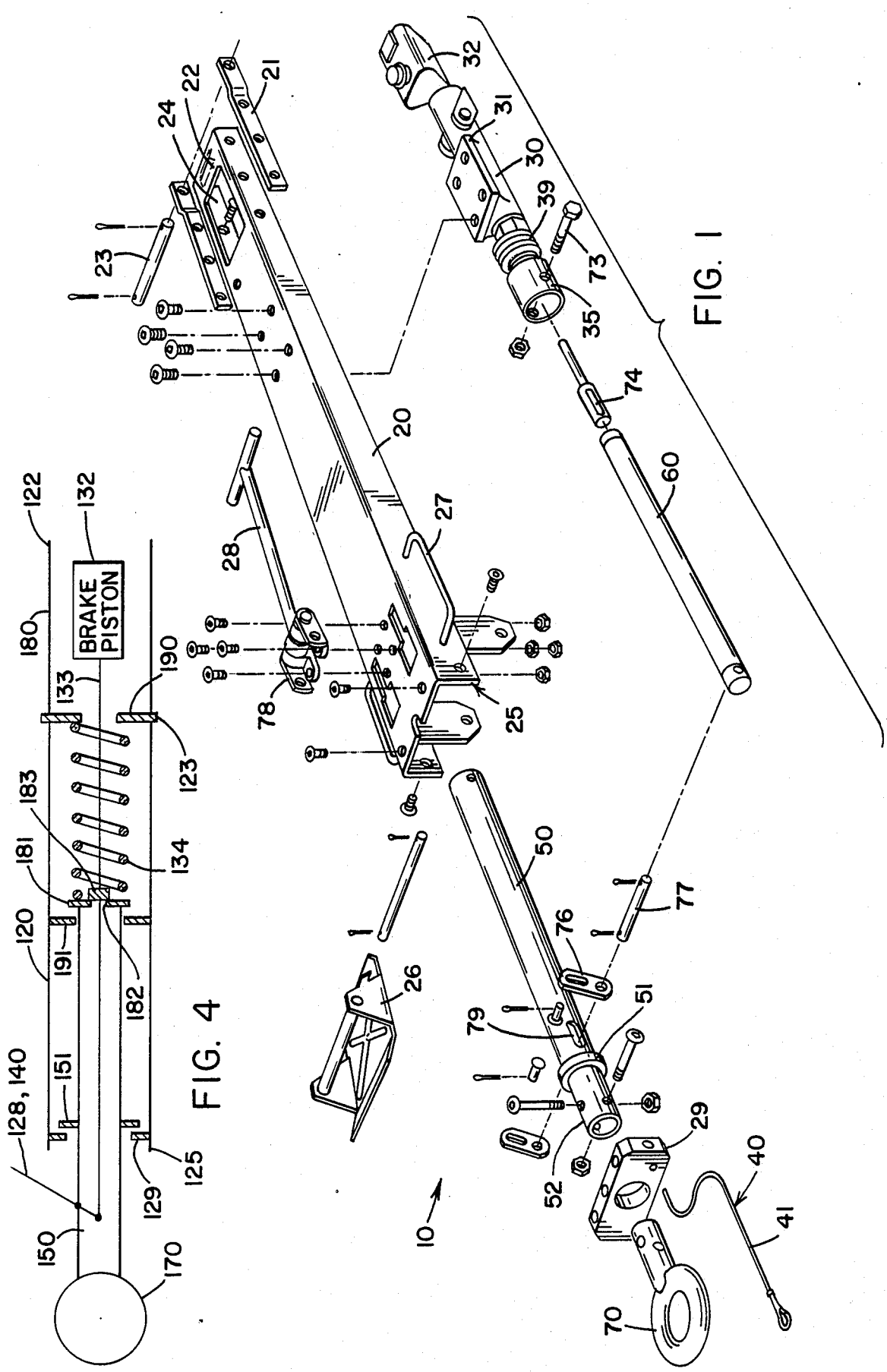

SURGE BRAKE

BACKGROUND OF THE INVENTION

Surge brakes utilize the differential inertia between a slowing pulling vehicle and a pulled trailer to slow the trailer in proportion to the slowing pulling vehicle. The typical surge brake is a device having a solid connection for forward forces and a spring loaded movable connection for backward forces. When the pulling vehicle is towing the trailer the solid forward connection is operative to directly connect the trailer to the pulling vehicle. When the pulling vehicle is slowing the undiminished momentum of the trailer begins to push and "run over" the pulling vehicle. This inertial force eventually builds up to overcome the spring of the spring loaded movable connection and thus moves the connection backward to operate the surge brake. The typical surge brake thus uses rather elementary properties of physics to operate a device that matches the rate of slowing of the trailer to the rate of slowing of the pulling vehicle.

One application for surge brakes is in the area of yard trailers. These trailers are four wheeled fully weight supported containers having a hinged front drawbar for connection to a pulling vehicle. The drawbar is normally connected to a steerable axle. The drawbar itself is typically perhaps six feet long with a lunette eye and hydraulic surge brake unit at its extending end. To connect the yard trailer to the pulling vehicle, the operator picks up the extending end of the drawbar and hooks the lunette eye over the pulling vehicles hitch eye. Unfortunately, due in no small part to the presence of the surge brake unit in the drawbar, the weight of the drawbar extending end can be one hundred to one hundred fifty pounds or more. The very act of lifting this weight off of the ground, let alone holding it in the air during the line up and connection process, demands significant physical strength and coordination. In addition due to the necessity of overcoming the spring of the spring loaded movable connection before the yard trailers brakes can be applied, the yard trailer is effectively without brakes unless hitched to a pulling vehicle: it is very difficult for an individual person, even with a long lever, to compress the heavy spring.

OBJECT OF THE INVENTION

It is an object of this invention to reduce the effective weight of surge brake drawbars.

It is an object of this invention to allow the spring independent operation of surge brakes.

It is an object of this invention to improve the efficiency of hydraulic surge brake units.

Other objects and a more complete understanding of the invention may be determined from the following specification and drawings in which:

DESCRIPTION OF THE DRAWINGS

FIG. 1 is an expanded, perspective view of a drawbar incorporating the invention of this application, FIG. 4 is a simplified drawing of an alternate embodiment of the invention of this application.

SPECIFICATION

Figure 3:
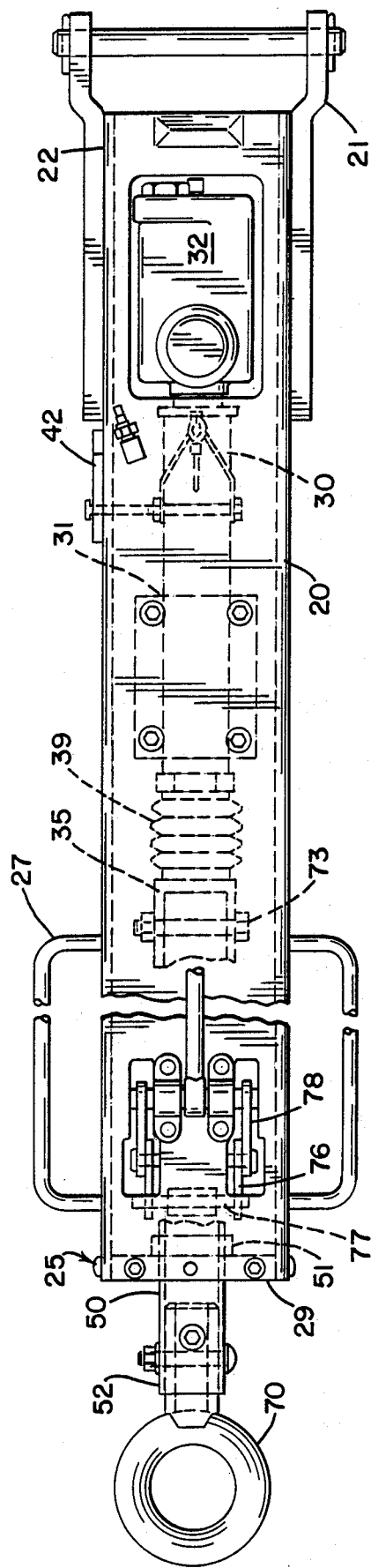
FIG. 3 is a top view of the drawbar of FIG. 2.

The invention of this application is described in the context of an improved drawbar surge brake for yard trailers. Yard trailers are very heavy multiple axle self-supporting trailers having a hinged drawbar for connection to a pulling vehicle (or other yard trailers in a series grouping). Normally the yard trailers include a steerable front axle associated with the drawbar. As the yard trailers themselves are very heavy, often 2300-4200 pounds bare weight and 7800-19200 pounds loaded, it is important for the trailers to include brakes. For functional efficiency surge brakes are utilized, customarily by including a hydraulic head unit into the extending end of the drawbar for each trailer. The yard trailer is thus ideal for the improved surge brake invention of this application.

The improved surge brake unit 10 itself includes a drawbar 20, an actuator assembly 30, an extension tube 50 and a hand brake actuator tube 60.

The drawbar 20 connects the yard trailer to a pulling vehicle. The drawbar 20 shown is a "u" shaped aluminum channel 6 foot long, 6 inches wide and 3 inches deep. The strength of this drawbar 20 is selected to be appropriate for the weight and service of the associated trailer. The disclosed drawbar weighs slightly over 100 pounds.

A set of hinge straps 21 are bolted to one end 22 of the drawbar 20. These hinge straps 21 hold the hinge pin 23 that connects the drawbar 20 to the yard trailer (not shown). (Note that this particular hinge contemplates an up-down movement between drawbar and tailer. Other modes of attachment may be more appropriate for a particular application. For example with a non-steerable axle trailer an additional pivot perpendicular to the ground allowing an additional sidewards movement of the drawbar would be appropriate.) An access hole 24 in this same end 22 of the drawbar 20 allows access to the actuator assembly 30 (later described). The other and extending end 25 of the drawbar 20 includes a skid 26 (for supporting the end 25 of the drawbar 20 off the ground when the drawbar 20 is not in use), a set of handles 27 (to allow one to hold the drawbar 20 during the manual manipulation thereof), a pivotal hand brake handle 28 (to allow one to selectively manually apply the brakes of the trailer as later described), and a tube support block 29 (purpose later described).

The actuator assembly 30 provides the application force for the trailer's brakes. In the preferred embodiment shown this actuator assembly is a hydraulic surge brake unit. This actuator assembly, as one of the heaviest parts of the unit, is located near the hinge pin end 22 of the drawbar in order to reduce the weight on the extending end 25 of the drawbar 20. This weight in the preferred embodiment shown is approximately 40 pounds.

The actuator assembly shown is a hydraulic unit 30 having a tubular body 31, a piston actuator 32, a push rod 33, a spring 34 and an extension collar 35. (A mechanical or other surge brake unit could be utilized instead of the hydraulic unit if desired.) The tubular body 31 of the hydraulic unit 30 is positioned within the confines of the drawbar 20 bolted thereto. The tubular body 31 retains the other pieces of the hydraulic brake unit 30 in position. The piston actuator 32 is bolted to the tubular body 31 near the hinged end 22 of the drawbar 20 with the push rod 33 extending coaxially into a cavity 36 in such tubular body 31. The extension collar extends towards the free end 25 of the drawbar into the cavity 36 from the other end of the tubular body 31 with the spring 34 trapped between the collar 35 and body 31. The extension collar 35 also surrounds the push rod 33 with the end 37 of the push rod 33 butting up against a plane including an internal ledge 38 of the extension collar 35 and the fixed end of a rod (later described).

Upon movement of the extension collar 35 into the tubular body 31 against the force of the spring 34 (as later described), the push rod 33 is pushed into the piston actuator 32 to apply the brakes of the trailer. A bellows seal 39 extends between the extension collar 35 and tubular body 31 to ease this movement by providing a seal for the sliding surfaces therebetween. In the preferred embodiment described there is a 35-40 pound initial preload on the spring 34 with 10 to 15 pounds additional per ⅛ inch of travel.

Figure 2:
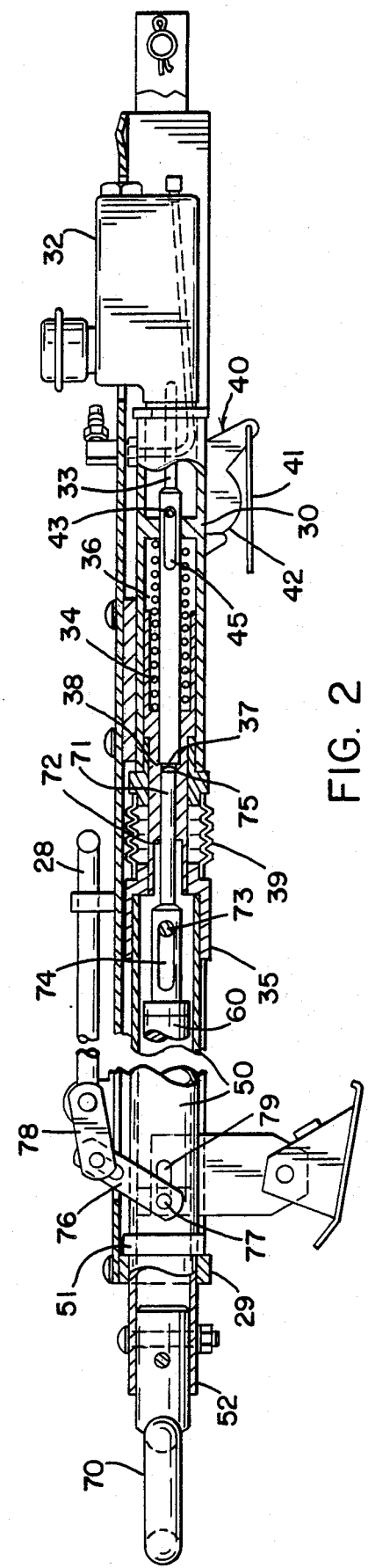
FIG. 2 is a cutaway side view of the drawbar of FIG. 1.

A separation brake unit 40 is also connected to the push rod 33 within the tubular body 31 (FIG. 2). The separation brake unit 40 includes a cable 41, a ratcheted cam 42 and a pin 43. The cable 41 is connected loosely between the ratcheted cam 42 and the pulling vehicle. The ratcheted cam 42 is itself rotatively connected to the side of the tubular body 31 with the off-center pivot pin 43 extending through a lost motion slot 45 in the push rod 33. Upon longitudinal movement of the cable 41 (such as would occur on accidental trailer separation from the pulling vehicle), the cam 42 is rotated forcing the push rod 33 into the piston actuator 32 (via the pin 43) to apply the brakes of the trailer. Since the push rod 33 is not itself directly connected to the spring 34, the force of the spring 34 is irrelevant to this application of the brake by the separation brake 40. Due to the lost motion slot 45, the separation brake unit 40 is itself irrelevant to any other braking movement of the push rod 33 — i.e. by the extension collar 35 or otherwise. Once the separation brake 40 is actuated it is preferred that the brakes stay on until the ratcheted cam 42 is manually released.

The extension tube 50 connects the drawbar 20 to the lunette eye 70 for forward movement of the trailer and in addition connects the lunette eye 70 to the brake (via the extension collar 35) for braking the trailer. To reduce the weight of the extending end 25 of the drawbar 20, the extension tube 50 is made of a light material such as aluminum. The extension tube 50 extends beneath the drawbar 20 from a fixed connection (by bolt 73) to the extension collar 35 through a hole in the tube support block 29 to extend beyond the extending end 25 of the drawbar 20. A collar 51 is fixedly connected to the extension tube 50 behind the tube support block 29 a short distance from the extending end 52 of the extension tube 50. The lunette eye 70 in turn is fixedly connected to the extending end 52 of the extension tube. The collar 51 is positioned such that upon forward movement of the pulling vehicle, the forward movement is passed from the lunette eye 70, through a short distance of the extension tube 50 to the collar 51, from the collar 51 to the tube support block 29 and thus to the drawbar 20. On slowing of the pulling vehicle, the inertia of the trailer forces the drawbar 20 forward in respect to the lunette eye 70 (with the extension tube 50 sliding within the tube support block 29). This in turn moves the extension collar 35 push rod 33 assembly into the piston actuator 32 to apply the brakes for the trailer.

As an added feature the preferred embodiment includes a hand brake 28 and an actuator tube 60 to allow for the independent, manual application of the trailer brake. This allows an individual some measure of manual control a trailer (such as a trailer moving down a slope). The hand brake actuator tube 60 is located coaxially within the extension tube 50 with a rod portion 71 extending through a central hole 72 in the extension collar to abut the end 37 of the brake push rod 33. A link 76 connects the other end of the actuator tube 70 to the hand brake 28 (via a pin 77 through two slots 79 in the sides of the extension tube 50).

In the normal operation, the bolt 73 abuts the end of the slot 74 (as shown) to retain the end 75 of the actuator rod 70 in the same plane as the ledge 38 of the extension collar 35. This provides a single plane for contact with the end 37 of the brake push rod 33, thus spreading out the normal, inertial brake activating forces.

When the hand brake 28 is operated, the initial movement of the hand brake (80 degrees shown) serves merely to locate the bottom 78 of the hand brake 28 in a position to pull the links 76 rearward in line with the extension tube 50 (thus insuring both maximum leverage and operational efficiency). Further movement of the hand brake 28 moves the actuator tube 60 and push rod 33 towards the piston actuator 32 to apply the brakes for the trailer. Again since neither the hand brake 28, actuator tube 60 or push rod 33 are connected to the spring 34, the force of the spring 34 is irrelevant to this application of the brake by the hand brake 28. (And due to the two lost motion connection slots 45 and 73 the other parts of the unit 10 are also irrelevant).

Due to the unique location and assembly of parts in this invention, the drawbar is lighter than otherwise possible and in addition the trailer can be braked independently of the main operating spring. However, although a particular embodiment has been disclosed, numerous changes may be made without departing from the invention as hereinafter claimed. For example an alternate embodiment of the invention is disclosed in FIG. 4. In this alternate embodiment the hinge points 123 are located a distance from the end 122 of the drawbar 120 in order to provide a counterbalance section 180 (to further reduce the effective weight of the extending end 125 of the drawbar) and the internal operating mechanism for the device has been simplified.

The relocation of the hinge points 123 a distance from the end 122 of the drawbar 120 provides for lengths of the drawbar 120 on either side of the hinge points 123. Preferably these lengths are selected in consideration of the total operating weight of the drawbar 120 (including components) to produce the positive weight even further to perhaps 25 pounds on the extending end 125 of the drawbar. Note that since the brake piston actuator 132 is one of the heaviest components, and in the invention this component 132 is located near the end 122 of the drawbar 120, the counterbalance end 122 will not normally engage the ground during the usage of the drawbar 120 (i.e. the length of the drawbar 120 from the end 122 to the hinge points 123 is normally less than the distance from the hinge points 123 to the ground in total and much less in consideration to the normal angular movement of the drawbar 120). The hinge points 123 are located at (or neighboring) the spring stop 190 for the drawbar 120, thus providing an integral reinforcement for the critical hinge 123 connection. Preferably the hinge points 123 are integral with the spring stop 190 or otherwise fixedly connected thereto (welding, bolting, etc.).

The simplification of the internal operating mechanism provides two moving parts.

The first moving part is the extension tube 150. The extension tube 150 shown is a generally tubular member having a lunette eye 170, a stop collar 151 and a spring bracket 181. The lunette eye 170 is for connection to the pulling vehicle. The stop collar 151 cooperates with the tube support block 129 to connect the extension tube 150 to the drawbar 120—fixedly for forward movement and slidably for braking. The spring bracket 181 closes the end of the extension tube 150 to provide a face for engaging the spring 134. In addition the spring bracket 181 shown has a central hole 182 for support of the surge brake push rod 133. A stop 183 is located on the surge brake push rod 133 adjacent to the spring bracket 181 with the brake push rod 133 itself extending almost the length of the extension tube 150 further to connect to a unitary extension tube mounted hand brake 128 and break away 140 operating mechanism. It is preferred that the extension tube 150 be slidingly connected to the drawbar 120 at the location of the spring bracket 181 so as to insure continued alignment of all parts. In the embodiment shown this is accomplished by bolting a plate 191 to the drawbar 120 surrounding the extension tube 150 a bit beyond the spring bracket 181. This plate also aids the retention of the spring 134.

To operationally brake the yard trailer, the extension tube 150 is pushed against the spring 134 to engage the spring bracket 181 and the stop 183 on the push rod 133 to apply the brake.

To manually brake the yard trailer, the hand brake 128 is manipulated to push the push rod 133 to apply the brake (again the spring 134 is not compressed).

Other changes are also possible without deviating from the invention as claimed.

What is claimed is:

1. An improved trailer drawbar brake operator comprising a body, said body having two ends, hinge means to rotatively connect one end of said body of the drawbar to the trailer, a brake unit, means to mount said brake unit to said one end of said body substantially neighboring said hinge means, hitch means, an extension tube, said extension tube having two ends, means to connect said hitch means to one end of said extension tube, means to slidably mount said extension tube to the other end of said body of said drawbar, a brake push rod, means to connect said brake push rod to said brake unit to operate said brake unit, lost motion connection means connecting the other end of said extension tube to said brake push rod, spring means between said other end of said extension tube and said drawbar, and means to selectively operate said brake push rod independently of said spring means.

2. The improved trailer drawbar brake operator of claim 1 characterized in that part of said brake push rod is located coaxially within said extension tube.

3. The improved trailer drawbar brake operator of claim 1 characterized in that said brake push rod includes an extension connection, and said spring means and said other end of said extension tube being located within said extension connection.

4. The improved trailer drawbar brake operator of claim 3 characterized in that said extension tube, said extension connection and said spring are coaxial.

5. The improved trailer drawbar brake operator of claim 1 characterized in that said hinge means is located a spaced distance from said one end of said body of the drawbar.

6. An improved trailer drawbar brake operator comprising a body, said body having two ends, hinge means to rotatively connect one end of said body of the drawbar to the trailer, a brake unit, means to mount said brake unit to said one end of said body substantially neighboring said hinge means, hitch means, an extension tube, said extension tube having two ends, means to connect said hitch means to one end of said extension tube, means to slidably mount said extension tube to the other end of said body of said drawbar, a brake push rod, means to connect said brake push rod to said brake unit to operate said brake unit, a lost motion connection means connecting the other end of said extension tube to said brake push rod, spring means between said other end of said extension tube and said drawbar, means to selectively operate said brake push rod independently of said spring means, part of said brake push road extending within said extension tube and said means to selectively operate said brake push rod independently of said spring means engaging said part of said brake push rod within said extension tube.

7. An improved trailer drawbar brake operator comprising a drawbar body, said body of said drawbar having two ends, hitch means to connect one end of said body of said drawbar to a trailer having brakes, a piston actuator, said piston actuator having a brake push rod extending therefrom for activating the brakes of the trailer upon movement of said brake push rod towards said one end of said body of said drawbar, means for fixedly fastening said piston actuator to said one end of said body with said brake push rod extending towards the other end of said body, an extension tube, means to slidably connect said extension tube to the other end of said body of said drawbar with one end of said extension tube protruding therefrom, hitch means connected to said one end of said extension tube, stop means to stop the outward movement of said extension tube beyond a certain point so as to rigidly connect said hitch means to said body of said drawbar through said extension tube for forward movement of the trailer, means to connect the other end of said extension tube to said brake push rod so as to pass movement of said extension tube towards said one end of said body of said drawbar to said brake push rod while allowing the independent movement of said brake push rod, spring means to resist the movement of said extension tube towards said one end of said body, said spring means including a spring surrounding said brake push rod and additional means to selectively move said brake push rod towards said one end of said body of said drawbar independently of said spring means.

8. An improved trailer drawbar brake operator comprising a drawbar body, said body of said drawbar having two ends, hitch means to connect one end of said body of said drawbar to a trailer having brakes, a piston actuator, said piston actuator having a brake push rod extending therefrom for activating the brakes of the trailer upon movement of said brake push rod towards said one end of said body of said drawbar, means for fixedly fastening said piston actuator to said one end of said body with said brake push rod extending towards the other end of said body, an extension tube, means to slidably connect said extension to be to the other end of said body of said drawbar with one end of said extension tube protruding therefrom, hitch means connected to said one end of said extension tube, stop means to stop the outward movement of said extension tube beyond a certain point so as to rigidly connect said hitch means to said body of said drawbar through said extension tube for forward movement of the trailer, means to connect the other end of said extension tube to said brake push rod so as to pass movement of said extension tube towards said one end of said body of said drawbar to said brake push rod while allowing the independent movement of said brake push rod, spring means to resist the movement of said extension tube towards said one end of said body, said spring means including a spring surrounding said brake push rod, additional means to selectively move said brake push rod towards said one end of said body of said drawbar independently of said spring means, and said additional means to selectively move said brake push rod towards said one end of said body of said drawbar independently of said spring means including an actuator rod portion extending coaxially through part of said extension tube to engage said brake rod.

9. The improved drawbar brake operator of claim 7 characterized in that said extension tube is coaxial with said brake push rod and said spring means includes a spring coaxial with and surrounding said brake push rod with one end of said spring engaging said extension tube and the other end of said spring connected to said body of said drawbar.

10. The improved drawbar brake operator of claim 9 characterized in that said additional means to selectively move said brake push rod towards said one end of said body of said drawbar independently of said spring means includes a hand brake handle, means to movably connect said hand brake handle to said drawbar and means to connect said hand brake handle to said actuator rod portion.

11. An improved trailer drawbar brake operator comprising a body, said body having two ends and a length, a hinge to rotatively connect one end of said body of the drawbar to the trailer, a brake unit, said brake unit being mounted to said one end of said body substantially neighboring said hinge and a distance from the other end of said body, a hitch, an extension tube, said extension tube having two ends, said hitch being connected to one end of said extension tube, and a length between the ends thereof, said length of said extension tube being greater than said distance of said brake unit from the other end of said body, said extension tube being slidably mounted to said other end of said body of said drawbar for rigid forward and lost motion reverse motion, a brake push rod, said brake push rod being connected to said brake unit to operate said brake unit, a lost motion connection connecting the other end of said extension tube to said brake push rod, a spring between said other end of said extension tube and said drawbar, and said brake push rod being selectively operable independently of said spring.

12. The improved trailer drawbar operator of claim 11 wherein said extension tube is hollow and characterized by the addition of an actuator tube, said actuator tube being located within said extension tube extending substantially for said length of said extension tube, said actuator tube being connected to said brake push rod and hand brake lever means to move said actuator tube to apply the brake.

13. The improved trailer drawbar operator of claim 12 characterized in that said hand brake lever means includes a hand lever mounted to the other end of said body of said drawbar.

14. The improved trailer drawbar brake operator of claim 11 characterized in that said hinge is located a spaced distance from said one end of said body of the drawbar.

15. The improved trailer drawbar brake operator of claim 11 characterized in that part of said brake push rod extends within said extension tube and said means to selectively operate said brake push rod independently of said spring engages said part of said brake push rod within said extension tube.

16. The improved trailer drawbar operator of claim 11 characterized in that said lost motion connection between the other end of said extension tube to said brake push rod is provided by the addition of an extension collar being located between said other end of said extension tube and said brake push rod, said extension tube being connected to said extension collar, said extension collar being connected to said brake push rod for movement in one direction and none in the other.

17. An improved trailer drawbar brake operator comprising a drawbar body, said body of said drawbar having two ends and a length between the ends thereof, a hitch to connect one end of said body of said drawbar to a trailer having brakes, a piston actuator, said piston actuator having a brake push rod extending therefrom for activating the brakes of the trailer upon movement of said brake push rod towards said one end of said body of said drawbar, said piston actuator being fixedly connected to said one end of said body a distance from the other end of said body with said brake push rod extending towards said other end of said body, an extension tube, said extension tube being slidably connected to the other end of said body of said drawbar with one end of said extension tube protruding therefrom, said extension tube having a length, said length of said extension tube being greater than said distance of said piston actuator from said other end of said drawbar body, said hitch connected to said one of said extension tube, a stop to stop the outward movement of said extension tube beyond a certain point so as to rigidly connect said hitch to said body of said drawbar through said extension tube for forward pulling movement of the trailer, said extension tube being slidable backwards on braking overrun movement of the trailer, the other end of said extension tube being connected to said brake push rod so as to pass movement of said extension tube towards said one end of said body of said drawbar to said brake push rod while allowing the independent movement of said brake push rod, a spring to resist the movement of said extension tube towards said one of said body, said spring including a spring surrounding said brake push rod and an additional means to selectively move said brake push rod towards one end of said body of said drawbar independently of said spring.

18. The improved drawbar brake operator of claim 17 characterized in that said additional means to selectively move said brake push rod towards said one end of said body of said drawbar independently of said spring means includes an actuator rod portion extending coaxially through part of said extension tube to engage said brake push rod.

19. The improved drawbar brake operator of claim 17 characterized in that said extension tube is coaxial with said brake push rod and said spring includes a spring coaxial with and surrounding said brake push rod with one end of said spring engaging said extending tube and the other end of said spring connected to said body of said drawbar.

20. The improved drawbar brake operator of claim 19 characterized in that said additional means to selectively move said brake push rod towards said one end of said body of said drawbar independently of said spring includes a hand brake handle, said hand brake handle being movably connected to said drawbar and said hand brake handle being connected to said actuator rod portion.

* * * * *